US012585942B2

(12) United States Patent
Sun et al.

(10) Patent No.: US 12,585,942 B2
(45) Date of Patent: Mar. 24, 2026

(54) METHOD AND SYSTEM FOR MACHINE LEARNING AND PREDICTIVE ANALYTICS OF FRACTURE DRIVEN INTERACTIONS

(71) Applicant: Chevron U.S.A. Inc., San Ramon, CA (US)

(72) Inventors: Jianlei Sun, Houston, TX (US); Brandon Francis Hruby, Denver, CO (US); Cory Layne Miller, Denver, CO (US); Arvind Reddy Battula, Sugar Land, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 757 days.

(21) Appl. No.: 17/936,737

(22) Filed: Sep. 29, 2022

(65) Prior Publication Data

US 2023/0097426 A1     Mar. 30, 2023

Related U.S. Application Data

(60) Provisional application No. 63/250,509, filed on Sep. 30, 2021.

(51) Int. Cl.
| | |
|---|---|
| *G06N 3/08* | (2023.01) |
| *E21B 44/06* | (2006.01) |
| *G06N 3/044* | (2023.01) |
| *G06N 3/048* | (2023.01) |

(52) U.S. Cl.
CPC .............. *G06N 3/08* (2013.01); *E21B 44/06* (2013.01); *G06N 3/044* (2023.01); *G06N 3/048* (2023.01)

(58) Field of Classification Search
None
See application file for complete search history.

(56) References Cited

U.S. PATENT DOCUMENTS

| | | | |
|---|---|---|---|
| 10,683,740 B2 | 6/2020 | Randall et al. | |
| 2020/0318474 A1* | 10/2020 | Sonnier | G05B 13/0265 |
| 2020/0392833 A1* | 12/2020 | Sengul | G06N 20/00 |

OTHER PUBLICATIONS

Johnson, David C., et al. "Offset fracture events made simple: an operator's collaborative approach to observe parent child interactions, measure frac hit severity and test mitigation strategies." SPE Hydraulic Fracturing Technology Conference and Exhibition. SPE, 2020. (Year: 2020).*

(Continued)

*Primary Examiner* — Eric Nilsson
(74) *Attorney, Agent, or Firm* — King & Spalding LLP

(57) ABSTRACT

A computing system includes a machine learning algorithm executing a machine learning model to predict a probability of a fracture driven interaction associated with a hydrocarbon well. The machine learning algorithm trains the machine learning model using well treatment pumping data, offset well production data, and well stage data. Feature extraction is performed on the pumping data, production data, and well stage data to produce a machine learning model that is used to predict the probability of a fracture driven interaction. The resulting machine learning model can be deployed for use in ongoing hydraulic fracturing operations to predict and reduce real-time fracture driven interactions.

19 Claims, 16 Drawing Sheets

100

(56)  References Cited

OTHER PUBLICATIONS

Chu, Min-gon, et al. "Determination of an infill well placement using a data-driven multi-modal convolutional neural network." Journal of Petroleum Science and Engineering 195 (2020): 106805. (Year: 2020).*

Song, Xuanyi, et al. "Time-series well performance prediction based on Long Short-Term Memory (LSTM) neural network model." Journal of Petroleum Science and Engineering 186 (2020): 106682. (Year: 2020).*

Mohaghegh, Shahab D., et al., Frac-Hit Dynamic Modeling Using Artificial Intelligence & Machine Learning, URTeC DOI 10.15530-urtec-20202647, Jul. 20-22, 2020.

Seth, Puneet, et al., Rapid Analysis of Offset Well Pressure Response During Fracturing, URTeC DOI 10.15530-urtec-2020-3129, Jul. 20-22, 2020.

Romero, Adriana, et al., Real Time Analysis for Early Frac-Hit Detection in Vaca Muerta's Natural Flowing Wells, URTeC DOI 10.15530-urtec-2020-1420, Nov. 16-18, 2020.

* cited by examiner

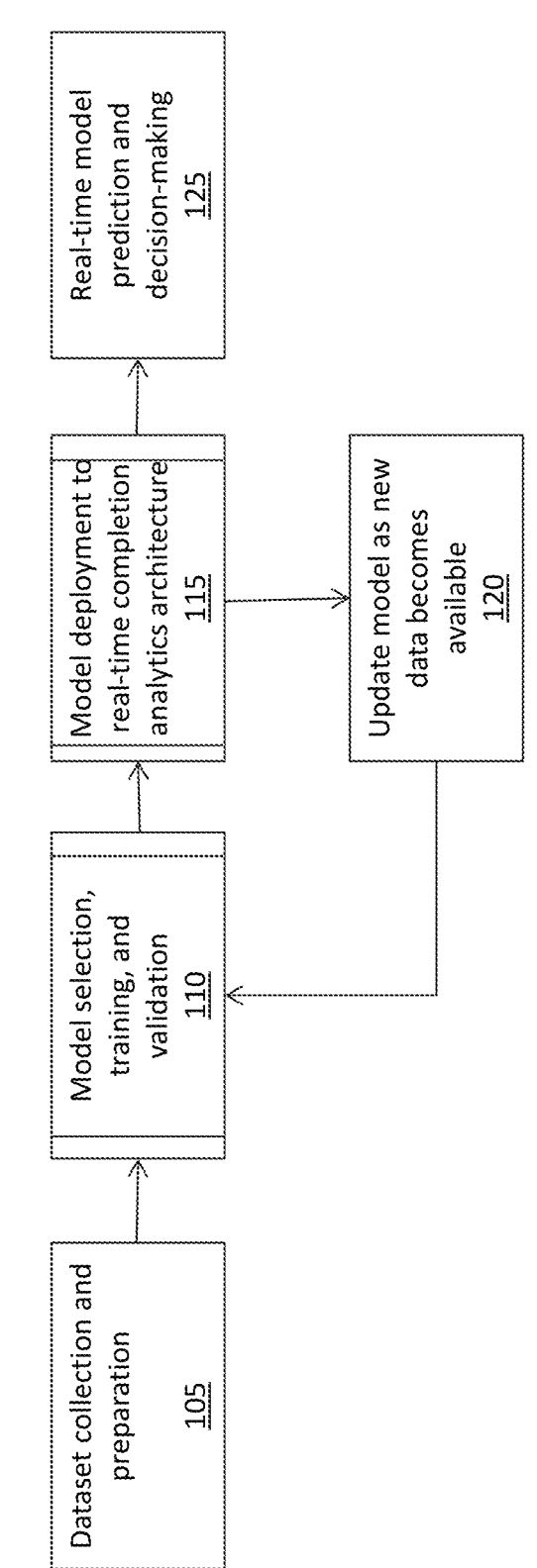
100
Dataset collection and preparation
105
Model selection, training, and validation
110
Model deployment to real-time completion analytics architecture
115
Update model as new data becomes available
120
Real-time model prediction and decision-making
125
FIG. 1

300

| Well Name | Stage Number | Offset Well Name | Casing/tubing | ΔPressure | ΔPressure ACQ/Ambient | Time | Type |
|---|---|---|---|---|---|---|---|
| Treatment well 1 | 1 | Offset Well 1, Offset Well 2 | casing/tubing | 500/700 | 100/-70 | date 1  18:10:00, date 1  18:15:00 | train |
| Treatment well 2 | 4 | Offset Well 1, Offset Well 3 | casing | 800/200 | 30/50 | date 2  01:15:00, date 2  01:30:00 | train |
| Treatment well 2 | 6 | Offset Well 2, Offset Well 3 | casing | 150/150 | 100/10 | date 2  19:00:00, date 2  19:15:00 | valid |
| Treatment well 3 | 10 | Offset Well 1, Offset Well 4 | casing/tubing | 120/80 | 200/-100 | date 3  03:45:00, date 3  03:50:00 | test |

FIG. 3A

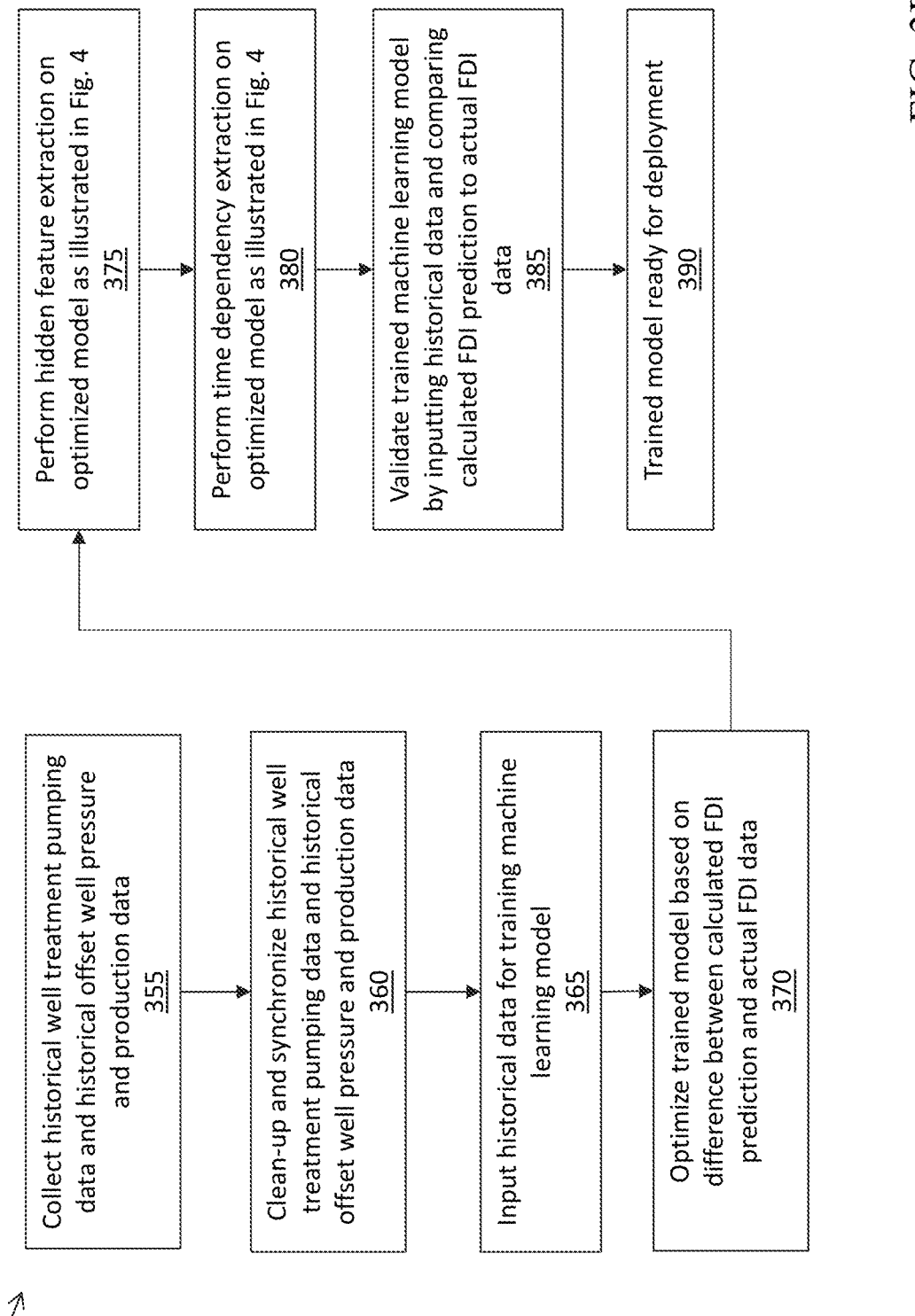

110

Collect historical well treatment pumping data and historical offset well pressure and production data
355

Clean-up and synchronize historical well treatment pumping data and historical offset well pressure and production data
360

Input historical data for training machine learning model
365

Optimize trained model based on difference between calculated FDI prediction and actual FDI data
370

Perform hidden feature extraction on optimized model as illustrated in Fig. 4
375

Perform time dependency extraction on optimized model as illustrated in Fig. 4
380

Validate trained machine learning model by inputting historical data and comparing calculated FDI prediction to actual FDI data
385

Trained model ready for deployment
390

FIG. 3B

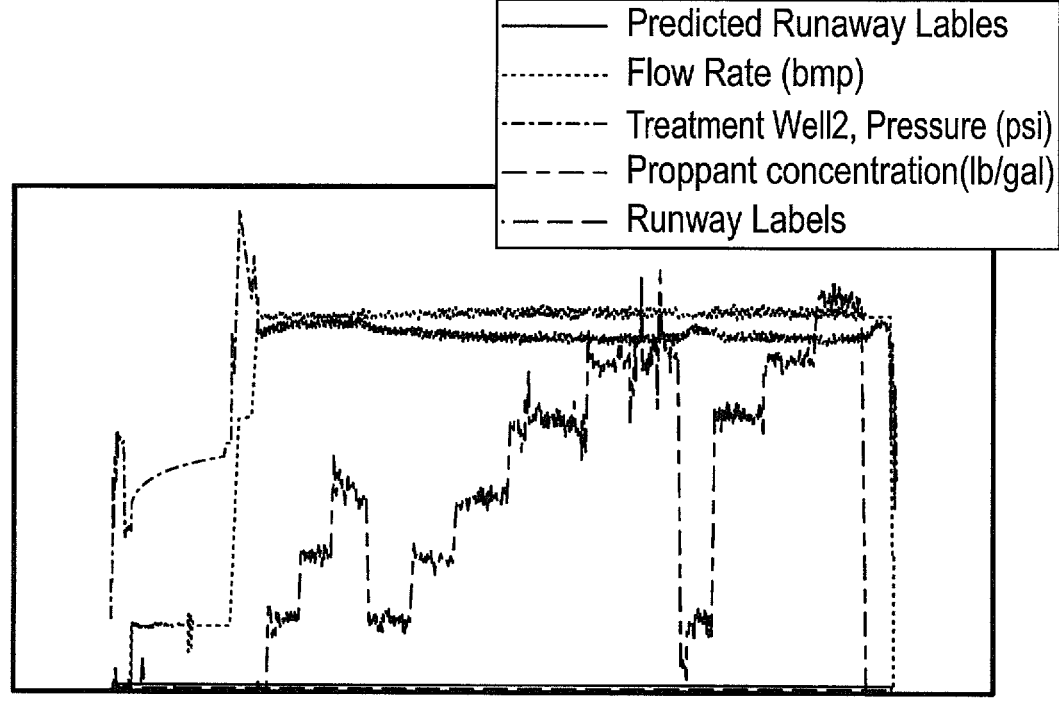
Predicted Runaway Lables
Flow Rate (bmp)
Treatment Well2, Pressure (psi)
Proppant concentration(lb/gal)
Runway Labels
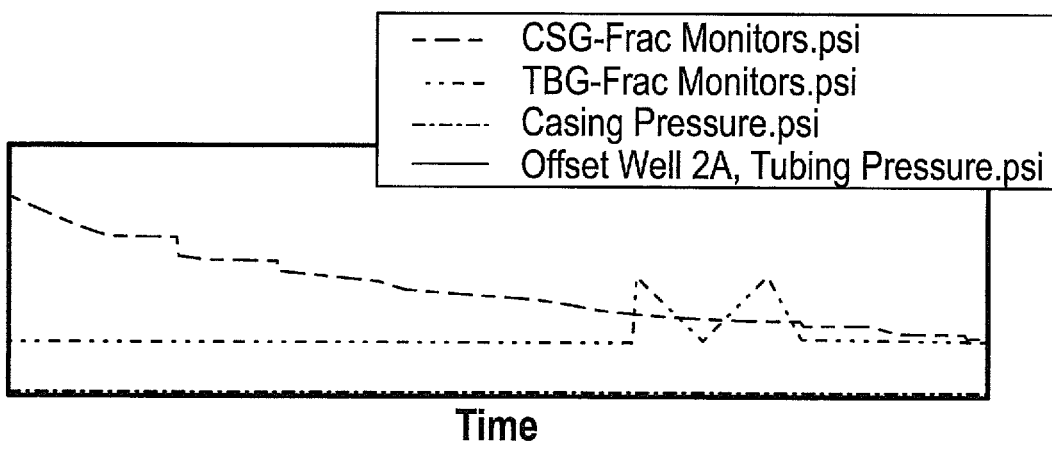
CSG-Frac Monitors.psi
TBG-Frac Monitors.psi
Casing Pressure.psi
Offset Well 2A, Tubing Pressure.psi
Time
FIG. 6

720

Docker Container 915

920  Model Prediction Service

Model Serving

Save Model (Model Serialization)

Model Repository

910

Model Training (Distributed Strategy)

Training Monitoring

905

METHOD AND SYSTEM FOR MACHINE LEARNING AND PREDICTIVE ANALYTICS OF FRACTURE DRIVEN INTERACTIONS

RELATED APPLICATIONS

The present application claims priority to U.S. Provisional Patent Application No. 63/250,509 filed Sep. 30, 2021, the entire content of which is incorporated herein by reference.

TECHNICAL FIELD

Embodiments of the technology relate generally to using machine learning to predict fracture driven interactions associated with a well.

BACKGROUND

Wells are drilled into land and subsea formations in order to produce hydrocarbon resources such as oil and natural gas. A field often comprises multiple wells that have been drilled into the formation, including parent wells and monitoring wells that are offset from the parent wells. Infill wells typically are drilled at a later time between existing parent wells and monitoring wells. Infill wells are used to recover oil and gas resources remaining in the formation after production has begun.

After a well is drilled and completed, it is common to treat or stimulate the well to produce the desired resources. Hydraulic fracturing is one example of a method for stimulating wells and is particularly useful in shale formations. When a hydraulic fracturing operation encounters an area of low pressure in a formation, the event can be referred to generally as a fracture driven interaction ("FDI").

An FDI event can inhibit production at the infill well and adjacent wells. Therefore, the ability to accurately predict and reduce FDI events can be useful to the production of a well and adjacent wells in a hydrocarbon field. Moreover, reducing FDI events can reduce costly downtime at the hydrocarbon field, thereby improving operation efficiency. Accordingly, the ability to accurately predict and reduce FDI events would be beneficial.

SUMMARY

In one example embodiment, the present disclosure is directed to a computing system for predicting the probability of an FDI event at an infill well. The computing system can comprise a processor, memory, and a machine learning algorithm stored in the memory and configured to execute a machine learning model. The machine learning model can comprise: a first input node configured to obtain well treatment data for an infill well and a first intermediate node configured to obtain the well treatment data from the first input node, perform feature extraction on the well treatment data, and output a reduced set of well treatment data. The machine learning model further can comprise: a second input node configured to obtain offset well production data and a second intermediate node configured to obtain the offset well production data from the second input node, perform feature extraction on the offset well production data, and output a reduced set of offset well production data. The machine learning model also can comprise a concatenation node configured to combine the reduced set of well treatment data and the reduced set of offset well production data and to output concatenated well data. Lastly, the machine learning also can comprise a prediction node configured to receive the concatenated well data and provide a probability of a fracture driven interaction event at the infill well. The foregoing example may include one or more of the following aspects.

In the foregoing system, the well treatment data and the offset well production data are real-time data associated with the infill well.

In another example of the foregoing system, the well treatment data and the offset well production data are historical data used to train the machine learning model.

In another example of the foregoing system, the prediction node can be a dense layer comprising a sigmoid activation function.

In another example of the foregoing system, the first intermediate node and the second intermediate node can each comprise a convolutional node and a pooling node.

In another example of the foregoing system, the machine learning model can further comprise a long short-term memory node configured to extract time dependencies of the concatenated well data.

In another example of the foregoing system, the well treatment data can comprise one or more of treatment pressure data, slurry flow rate data, or proppant concentration data.

In another example of the foregoing system, the offset well production data can comprise one or more of oil production data or water production data.

In another example of the foregoing system, the machine learning model can further comprise a third input node configured to receive static stage-level data associated with the infill well.

In another example of the foregoing system, the machine learning model can further comprise a third input node configured to receive pressure monitoring data comprising one or more of tubing pressure data or casing pressure data.

In another example embodiment, the present disclosure is directed to a computer-implemented method comprising: inputting well treatment data and offset well production data into a machine learning model, wherein the well treatment data and the offset well production data are associated with an infill well, and wherein the machine learning model was previously trained using historical well treatment data and historical offset well production data. The method further comprises: obtaining an output from the machine learning model, the output indicating a probability of a fracture driven interaction event at the infill well; and adjusting a hydraulic fracturing operation if the probability of the fracture driven interaction event exceeds a predetermined threshold. The foregoing example may include one or more of the following aspects.

In one example of the foregoing method, the machine learning model can generate a recommendation to adjust a hydraulic fracturing operation if the probability of the fracture driven interaction event satisfies a threshold, and can display a visual representation of the recommendation.

In another example of the foregoing method, the machine learning model can have been previously trained by: obtaining the historical well treatment data at a first input node; performing feature extraction on the historical well treatment data at a first intermediate node; outputting a reduced set of historical well treatment data from the first intermediate node; obtaining historical offset well production data at a second input node; performing feature extraction on the historical offset well production data at a second intermediate node; outputting a reduced set of historical offset well production data; combining the reduced set of well treatment data and the reduced set of offset well production data at a concatenation node and outputting concatenated well data; and calculating a probability of the fracture driven interaction event using a prediction node.

In another example, the foregoing method can further comprise validating the probability of the fracture driven interaction event against historical fracture driven interaction data.

In another example of the foregoing method, the prediction node can be a dense layer comprising a sigmoid activation function.

In another example of the foregoing method, the first intermediate node and the second intermediate node can each comprise a convolutional node and a pooling node.

In another example of the foregoing method, the machine learning model can further comprise a long short-term memory node configured to extract time dependencies of the concatenated well data.

In another example of the foregoing method, the well treatment data can comprise one or more of: treatment pressure data, slurry flow rate data, and proppant concentration data; and the offset well production data can comprise one or more of: oil production data and water production data.

In another example of the foregoing method, the well treatment data and the offset well production data are real-time data associated with the infill well.

In another example embodiment, the present disclosure is directed to a method of training a machine learning model by obtaining historical well treatment data at a first input node; performing feature extraction on the historical well treatment data at a first intermediate node; obtaining a reduced set of historical well treatment data from the first intermediate node; obtaining historical offset well production data at a second input node; performing feature extraction on the historical offset well production data at a second intermediate node; outputting a reduced set of historical offset well production data; combining the reduced set of well treatment data and the reduced set of offset well production data at a concatenation node and outputting concatenated well data; and calculating the probability of the fracture driven interaction event using the concatenated well data at a prediction node.

In another example, the foregoing method can comprise inputting well treatment data and offset well production data into the machine learning model, wherein the well treatment data and the offset well production data are associated with an infill well; receiving an output from the machine learning model, the output indicating a probability of a fracture driven interaction event at the infill well; and updating the machine learning model based on an accuracy of the probability of the fracture driven interaction event at the infill well when compared to actual data.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of a system, method, and computer-readable media for using real-time well data and a machine learning model to predict fracture driven interaction events. Therefore, the examples provided are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

FIG. 1 is a flowchart illustrating a process for training and deploying a machine learning model for predicting a probability of a fracture driven interaction in accordance with an example embodiment of the disclosure.

FIG. 3A illustrates a sample of data output from the machine learning model during the training, optimization, and validation of the model in accordance with an example embodiment of the disclosure.

FIG. 3B illustrates a method for training, optimizing, and validating the machine learning model in accordance with an example embodiment of the disclosure.

FIG. 6 provides a data plot output of a prediction by the machine learning model showing normal drilling stages without fracture driven interactions in accordance with an example embodiment of the disclosure.

DETAILED DESCRIPTION OF EXAMPLE EMBODIMENTS

Figure 2:
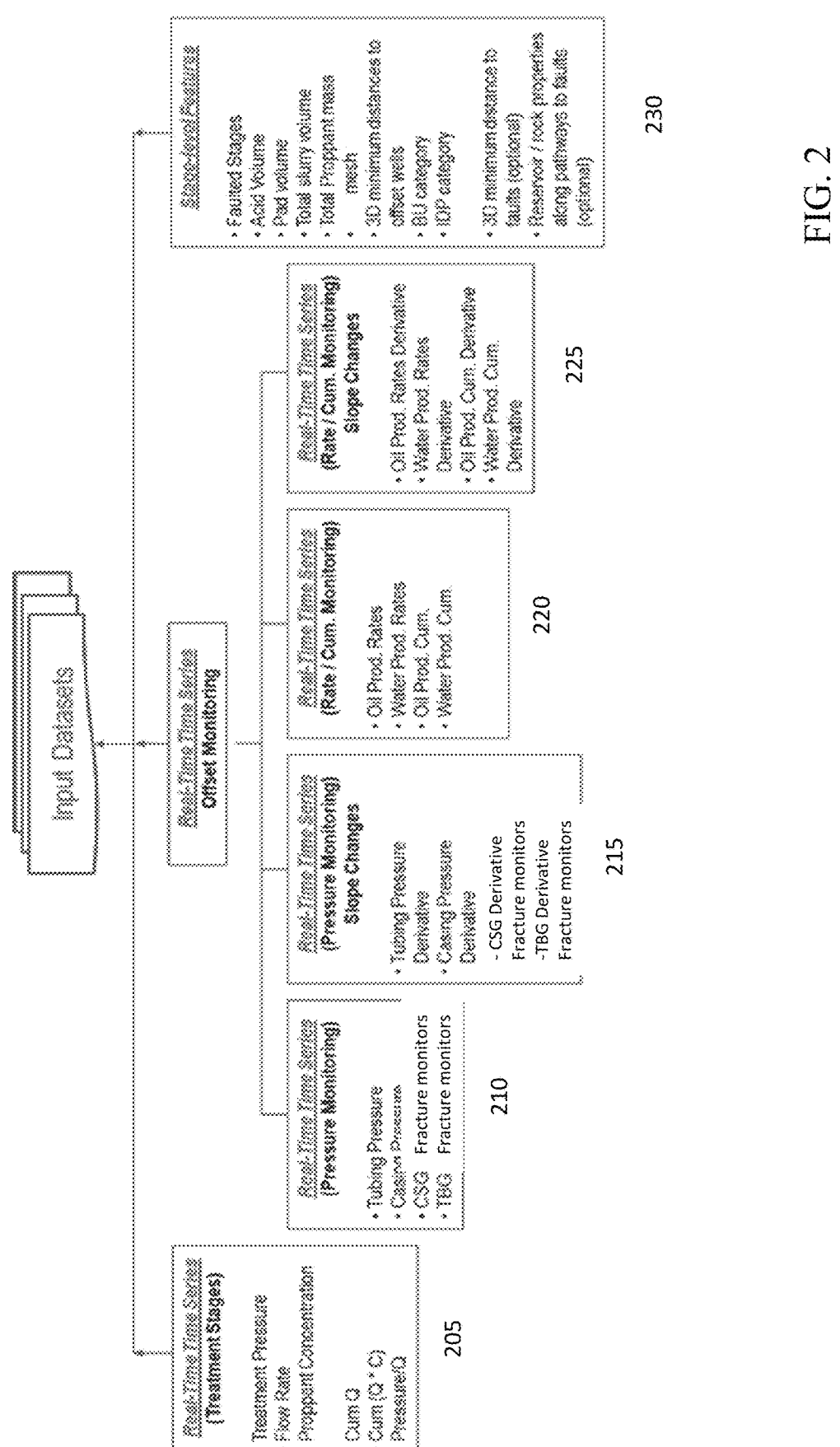
FIG. 2 illustrates categories of data that can be input into the machine learning model in accordance with an example embodiment of the disclosure.
Figure 4A:
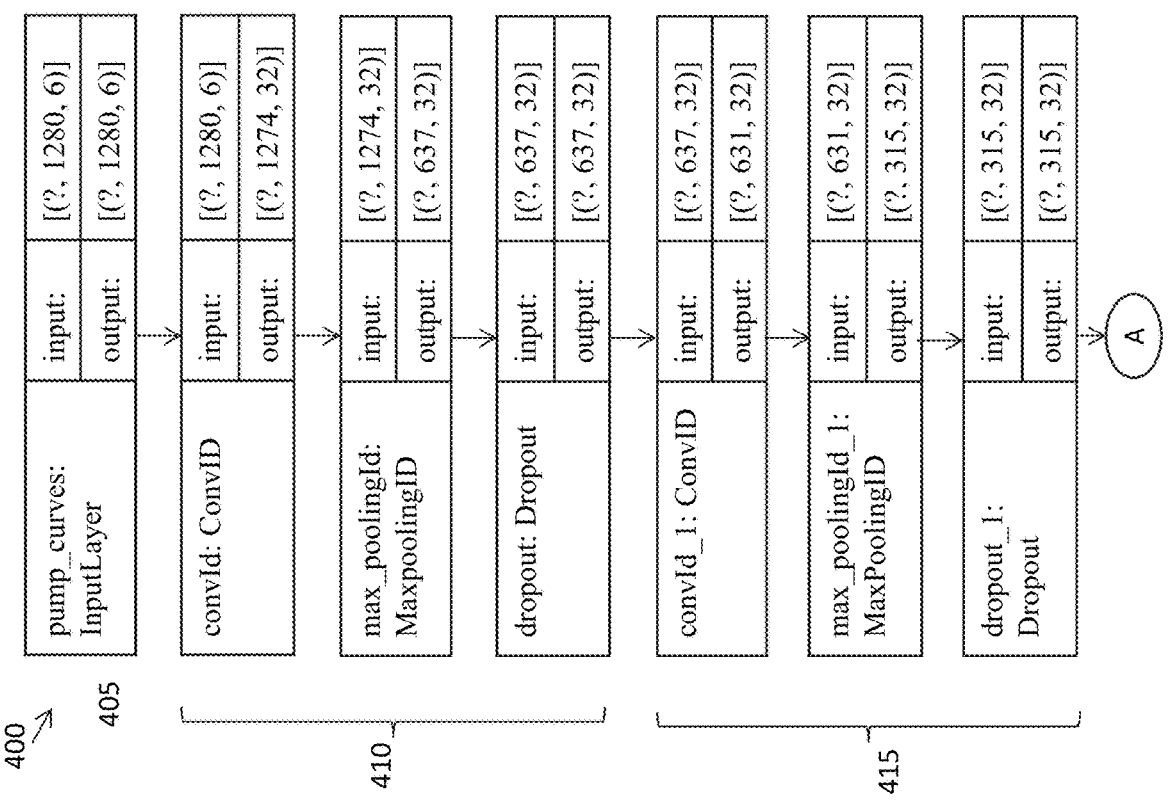
FIGS. 4A, 4B, 4C, and 4D illustrate an architecture for a neural network type of machine learning model in accordance with an example embodiment of the disclosure.
Figure 4B:
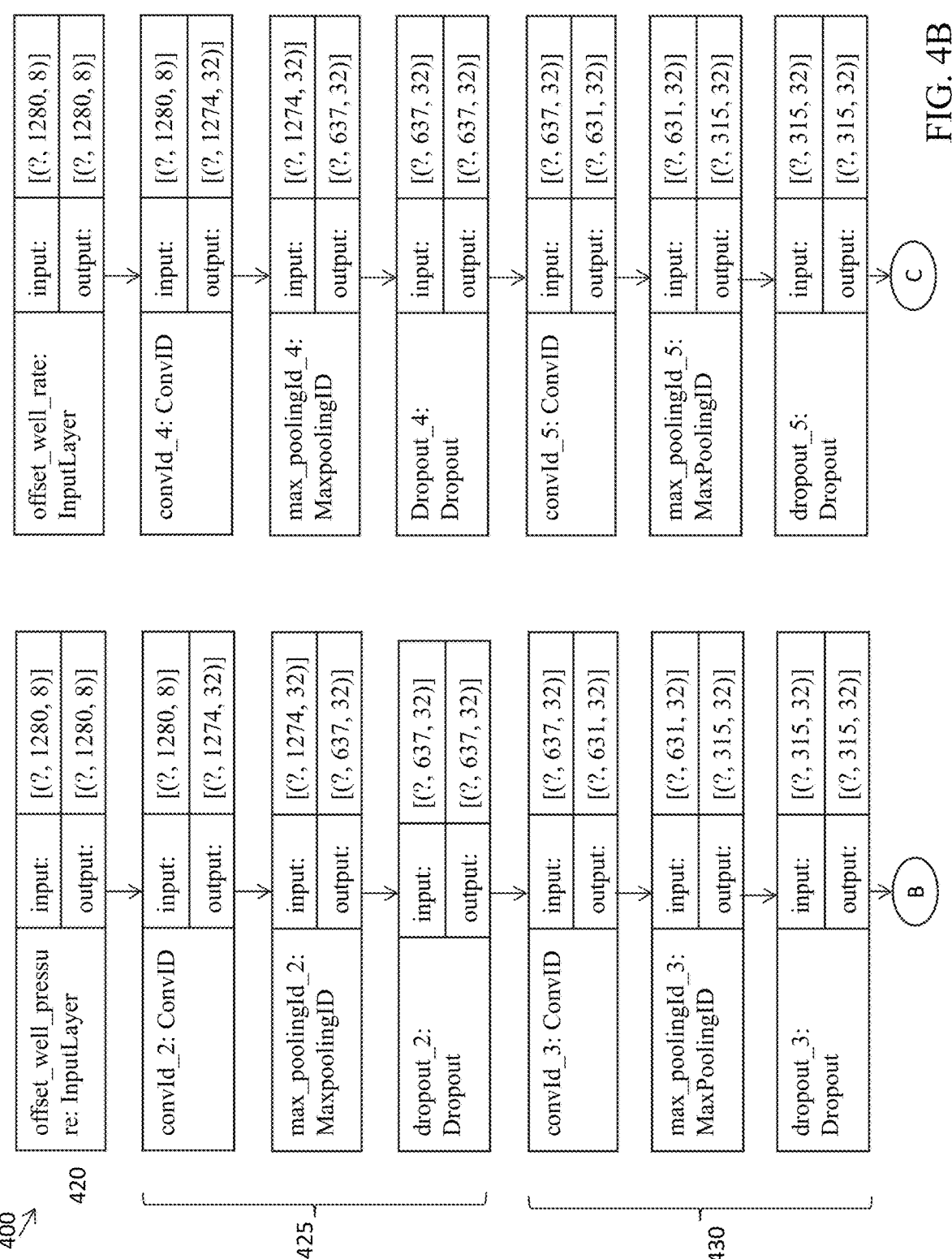
Figure 4C:
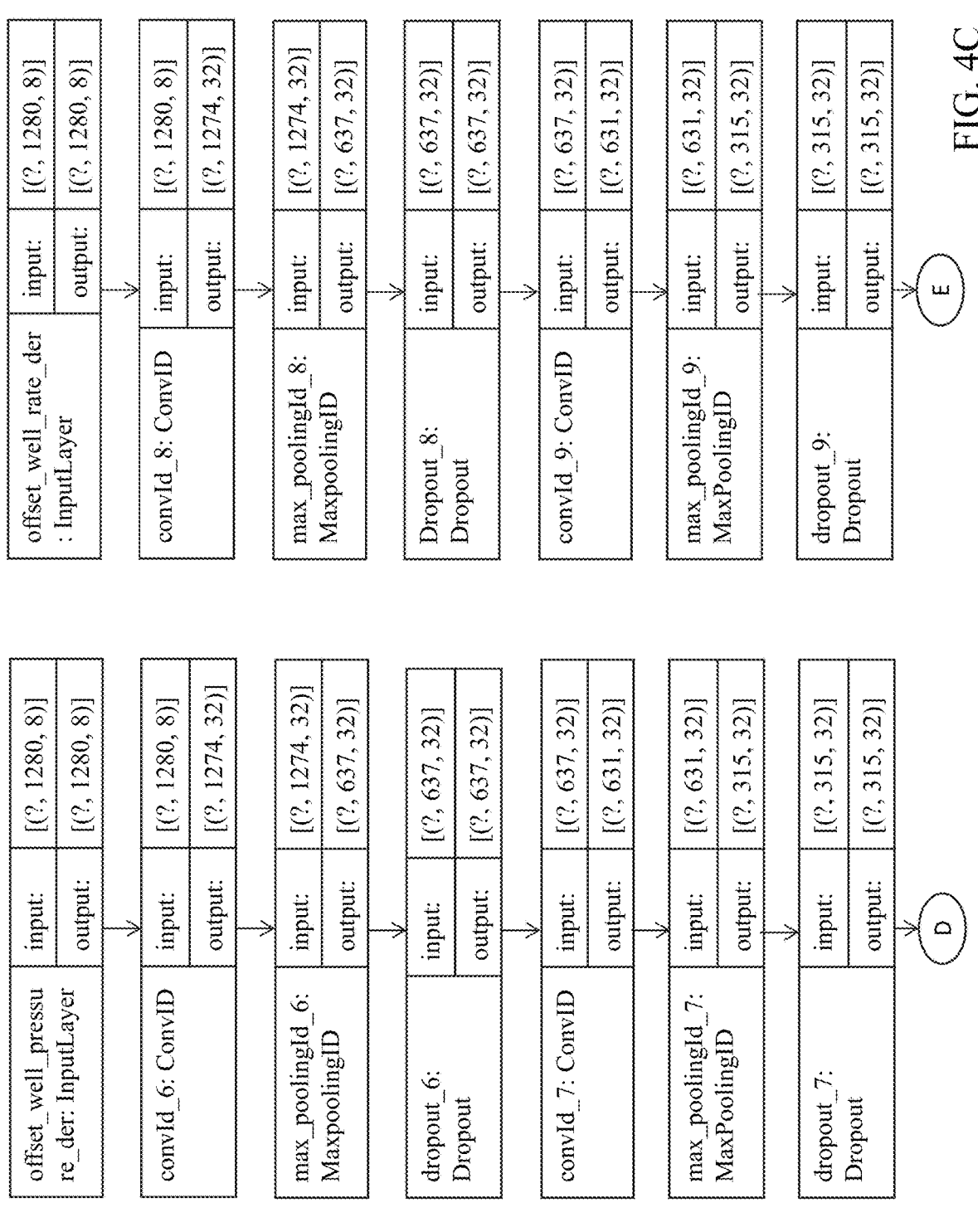
Figure 4D:
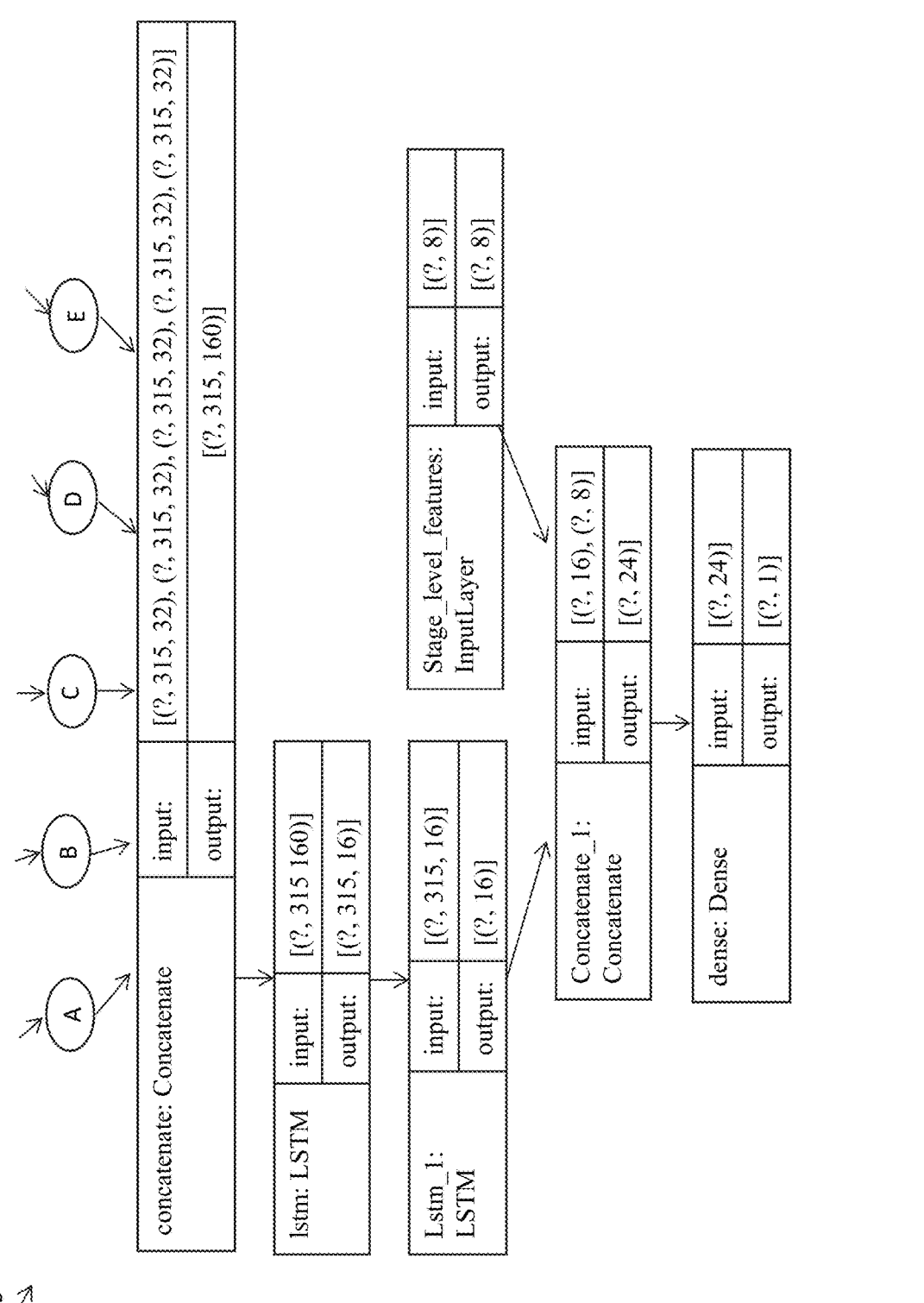

The example embodiments discussed herein are directed to systems, methods, and computer-readable media for predicting a probability of an FDI event at a well or multiple wells undergoing hydraulic fracturing. The example embodiments described herein use a machine learning algorithm to train a machine learning model that can be used to predict an FDI event during hydraulic fracturing operations so that the FDI event can be reduced. As will be described further in the following examples, the systems, methods, and computer-readable media described herein improve upon existing approaches to managing FDI events.

As general background, in hydraulic fracturing, a fracturing fluid may be prepared on-site to include at least proppants. The proppants, such as sand or other particles, are meant to hold the fractures open so that hydrocarbons can more easily flow to the wellbore. The fracturing fluid may also include other components in addition to the proppants. The fracturing fluid and the proppants may be blended together using at least one blender. The wellbore and the subsurface volume of interest proximate to the wellbore are in fluid communication (e.g., via perforations), and the fracturing fluid with the proppants is injected into the wellbore through a wellhead of the wellbore using at least one pump (oftentimes called a fracturing pump). The fracturing fluid with the proppants is injected at a sufficient rate and pressure to open existing fractures and/or create fractures in the subsurface volume of interest. As fractures become sufficiently wide to allow proppants to flow into those fractures, proppants in the fracturing fluid are deposited in those fractures during injection of the fracturing fluid. The fracturing fluid is removed by flowing or pumping it back out of the wellbore so that the fracturing fluid does not block the flow of hydrocarbons to the wellbore. The hydrocarbons will typically enter the same wellbore from the subsurface volume of interest and go up to the surface for further processing. The fracturing may be performed in stages in some implementations.

The equipment to be used in preparing and injecting the fracturing fluid may be dependent on the components of the fracturing fluid, the proppants, the wellbore, the subsurface volume of interest, etc. Hydraulic fracturing may include the following: tank(s), mixer(s), blender(s), pump(s), manifold(s), line(s), valve(s), fluid(s), fracturing fluid component(s), proppants, and other equipment and techniques related to preparing the fracturing fluid, injecting the fracturing fluid, and fracturing.

Existing approaches to managing FDI events either focus on analysis of data after the hydraulic fracturing operation or rely on unvalidated assumptions. As one example, existing approaches focus on data analysis after the hydraulic fracturing operation to estimate relationships between various parameters and possibilities of an FDI event, however, these existing approaches do not provide a real-time solution that can predict an FDI event while hydraulic fracturing operations are underway. As another example, a solution that restricts input data to only offset pressure values and provides an empirical solution based on hypothetical pressure changes fails to offer a solution that is validated against field data.

In contrast to existing approaches to managing FDI events, the example embodiments of the present disclosure use a machine learning model in combination with real-time pressure and production data to predict and reduce FDI events. Furthermore, the real-time data utilized in the example embodiments of the present disclosure is gathered both from the well that is being stimulated and from one or more offset monitoring wells. The techniques described herein also can be applied to multiple wells that are being stimulated simultaneously. Accordingly, the techniques of the example embodiments utilize a more comprehensive data set to provide a more accurate and useful solution than existing approaches.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Referring now to FIG. 1, an example method 100 is illustrated describing the process for training and deploying a machine learning model for use in predicting and reducing FDI events. It should be understood that in alternate example embodiments, one or more of the operations illustrated in FIG. 1 could be performed in parallel, performed a different sequence or eliminated. Beginning with operation 105, training data is collected from wells being treated and one or more offset monitoring wells. The data collected from the offset monitoring wells can be associated with or provide indications of the condition of the well that is being treated. The data that is collected and used for training can be historical data for a well or group of wells in the same hydrocarbon field as the well that is to be treated. Alternatively, the data that is collected and used for training can be historical data for a well or group of wells in another hydrocarbon field having characteristics similar to the well that is to be treated. As will be described further in connection with the other figures, the training data can include data related to pressure, flow rates, proppant concentration, and production rates.

The data collected in operation 105 is input into a selected model in operation 110 of method 100. In operation 110, a model is selected, trained, optimized, and validated. As one example, the model can be a machine learning model such as a deep learning neural network. In alternate embodiments, other types of mathematical models can be selected. A machine learning algorithm can input the collected data from operation 105 into the model and train the model to predict the probability of a fracture driven interaction occurring. As will be described further in connection with FIG. 3B, training the model may also involve optimizing and validating the model.

Referring to operation 115, once the model has been trained, the completed model can be deployed for use in a hydraulic fracturing operation involving one or more wells. As will be described further in connection with FIGS. 7-10, the model can be made available as a computing service to support hydraulic fracturing operations at a hydrocarbon field. As illustrated in operation 125, the model provides predictions of fracture driven interactions and the predictions can be used to manage the hydraulic fracturing operations at the hydrocarbon field. Additionally, as indicated by operation 120, as new data from the hydrocarbon field becomes available, the model can be updated by further training the model for greater accuracy.

Referring now to FIG. 2, example categories of data that can be input into the model are illustrated. It should be understood that the example categories of data of FIG. 2 are illustrative and, therefore, in alternate embodiments certain of the example categories of data shown in FIG. 2 can be omitted and other categories of data can be added to or substituted for the examples of FIG. 2. Furthermore, at least a portion of the data may be generated by one or more sensors (e.g., downhole sensors, surface sensors, pressure sensors, flow meters) installed at one or more wells, at one or more wellheads, at the surface, etc. Treatment data 205 includes data for the well that is being treated, such as the previously described infill well undergoing a hydraulic fracturing operation. The treatment data 205 can describe characteristics of the hydraulic fracturing operation, including treatment pressure, flow rate, proppant concentration, cumulative flow rate, cumulative flow rate multiplied by proppant concentration (Cum(Q*C)), and pressure divided by flow rate (pressure/Q). The foregoing data can be collected by pressure sensors and flow meters positioned in or at the surface of the well that is being treated.

The pressure monitoring data 210 and the pressure monitoring slope changes data 215 are gathered from offset monitoring wells. The data gathered from the offset monitoring wells can describe characteristics of the formation and the data is associated with the treatment data 205 of the infill well because activities at the infill well can affect the surrounding formation. The pressure monitoring data 210 includes data describing characteristics at the offset monitoring well, such as tubing pressure, casing pressure, casing pressure of additional fracturing monitors (CSG), and tubing pressure of additional fracturing monitors (TBG). The pressure monitoring slope changes data 215 reflects changes over time in the pressure monitoring data 210 including tubing pressure derivatives, casing pressure derivatives, casing pressure derivatives of additional fracturing monitors (CSG), and tubing pressure derivatives of additional fracturing monitors (TBG).

The data input into the model also includes offset well production data 220 and offset well production slope changes data 225 for oil and water produced at the offset wells. The offset well production data 220 can include oil production rates, water production rates, cumulative oil production volume, and cumulative water production volume. The offset well production slope changes data 225 includes oil production rate derivatives, water production rate derivatives, cumulative oil production volume derivatives, and cumulative water production volume derivatives. The offset well production data 220 and the offset well production slope changes data 225 serve as proxies for magnitudes of depletion of the reservoir in the formation.

An additional input to the model can include stage-level features data 230 which are variables that remain static during the hydraulic fracturing operation. The stage-level features data 230 can describe static characteristics of the hydraulic fracturing operation such as acid volume, pad volume, total slurry volume, total proppant mass, the proppant mesh and/or mesh percentage for the proppant, and minimum distances between each stage and neighboring offset monitoring wells. The stage-level features data 230 also can include relevant geophysical properties such as faulted stage indicators, reservoir and rock properties, and minimum distances between each stage, surrounding geological faults, and high-permeability channels. Lastly, the stage-level features data 230 can include commercial information such as the business unit category and the integrated development plan.

Referring now to FIG. 3A, a table is provided that includes a sample of data used for the training, optimization, validation, and testing of the machine learning model. The triggers column of the table indicates when a fracture driven interaction event occurs. The fracture driven interaction events can be identified by well completion engineers or other subject matter experts. The type column of the table indicates whether the data is used to train, validate, or test the model in connection with operation 110 illustrated in FIG. 1. Taking the first row of the table as an example, the sample data shows a fracture driven interaction event occurs between date 1 at 18:10:00 and date 1 at 18:15:00 for the first completion stage of treatment well 1. This fracture driven interaction event is associated with an increase of 500 psi in casing pressure, an increase of 700 psi in tubing pressure, and increase of 100 bpd in oil production rate, and a decrease of 70 bpd in water production rate.

The first two rows of data in the table of FIG. 3A are used in the data set for training the model. The training data are used to train the model to more accurately predict the probability of a fracture driven interaction event. This is an example of supervised training of the model because the training data that is input into the model is labeled. In addition to the training data in rows 1 and 2 of the table, row 3 provides an example of validation data and row 4 provides an example of test data. The validation and test data are input into the model separately from the training data and are used to determine the accuracy of the model and whether further optimizing of the model is needed.

Referring now to FIG. 3B, operation 110 of FIG. 1 is illustrated in greater detail. Some or all of the operations of FIG. 3B can be performed by a machine learning algorithm that trains and implements the machine learning model. In operation 355, input data such as the data described in connection with FIG. 2 is collected. As explained previously, the input data can include all of the data illustrated in FIG. 2, subsets thereof, or additional data. The data can be historical data collected from wells at the field of interest or from hydrocarbon fields having similar characteristics. In operation 360, the input data is cleaned up and synchronized so that it is in a useful format for inputting into the model. For example, the collected data is typically time series data that has time stamps indicating when it was collected. Because the data relates to various characteristics and is collected from various wells, the data may be collected at varying frequencies and can have varying time stamps. Accordingly, the collected data should be cleaned up and synchronized so that it provides accurate snapshots of the wells and the formation over time.

In operation 365, the machine learning algorithm inputs the cleaned up and synchronized data into the machine learning model. The machine learning algorithm can use the input data and the model to predict a probability that a fracture driven interaction event will occur. In operation 370, the machine learning algorithm can optimize the model by comparing calculated probabilities of an FDI event against actual FDI event data. By iterating the calculations of the model with large sets of input data, the machine learning algorithm can improve the accuracy of the model. In operations 375 and 380, as described further in connection with the model architecture illustrated in FIG. 4, the machine learning algorithm performs hidden feature extraction and time dependency extraction to further optimize the model.

In operation 385, the machine learning algorithm can validate the trained model to ensure it accurately calculates the probability of an FDI event. A set of historical well data that has not previously been used as training data can be input into the model for validation. Once the model has been validated, the final model is ready for deployment in operation 390.

FIGS. 4A, 4B, 4C, and 4D (collectively "FIG. 4") illustrate an example architecture for the machine learning model that is trained and implemented by the machine learning algorithm. In alternate embodiments, different types of model architectures having different nodes and different layers can be implemented. The example architecture of FIG. 4 is for a deep learning neural network model 400 or simply a deep learning model. The deep learning model 400 comprises 5 input branches corresponding to the 5 categories of time series input data previously described in connection with FIG. 2. In alternate embodiments, different numbers of input branches can be implemented for fewer or greater sets of input data. In the example deep learning model 400, the 5 input branches each include analogous nodes or layers.

Taking the left-most branch of FIG. 4 as an example, this is the treatment well branch that receives the treatment well data corresponding to the treatment data 205 of FIG. 2. A first input node 405, described in FIG. 4 as the pump curve input layer, receives a time series data array having a length of 1280 seconds and 6 features. The 6 features correspond to the 6 types of treatment data 205 described in connection with FIG. 2. The input node 405 supplies the treatment data 205 to a first intermediate node 410 that performs feature extraction. In the example of FIG. 4, the first intermediate node 410 comprises a convolutional node that detects features in the data and updates the parameters of the node based on the detected features. The example first node 410 also comprises a maximum pooling node that downsamples the data array to remove less significant data and a dropout node that removes data to prevent overfitting. The example treatment well branch of FIG. 4 includes a second interme- diate node 415 that also comprises a convolutional node, a maximum pooling node, and a dropout node. In alternate embodiments, a fewer or greater number of intermediate nodes having similar or different sub-nodes can be imple- mented. At the completion of the second intermediate node 415, the data array is reduced to 315 by 32.

The second branch from the left in the deep learning model 400 is the offset well pressure branch corresponding to the offset well pressure monitoring data 210 of FIG. 2. Similar to the first branch, this second branch has an input node 420 that receives a time series data array having a length of 1280 and 8 features. The 8 features correspond to the tubing pressure, the casing pressure, and multiple casing and tubing fracture monitors. The input node 420 supplies the pressure monitoring data to a first intermediate node 425 and a second intermediate node 430, which are similar to first and second intermediate nodes 410 and 415. At the completion of the second intermediate node 430, the data array for the pressure monitoring data 210 is reduced to 315 by 32.

The third, fourth, and fifth branches of the deep learning model 400 comprise similar nodes to the first two branches and perform similar operations on data arrays for the pres- sure monitoring slope changes data 215, the offset well production data 220, and the offset well production slope changes data 225. As with the first two branches, the remaining branches provide data arrays that are reduced to 315 by 32. Next, the deep learning model 400 comprises a concatenation node 440 that combines the 5 reduced arrays along the depth dimension resulting in a data array that is 315 by 160. The concatenated array is input into two long short-term memory nodes that extract underlying time dependencies among high frequency time series data thereby reducing the data array. This reduced array is concatenated with stage-level features data 230, which is input at node 450, and the result is a prediction node 460. The prediction node 460 can be a dense layer with a sigmoid activation function. The prediction node 460 provides a probability of a fracture driven interaction based on the input data.

Figure 5:
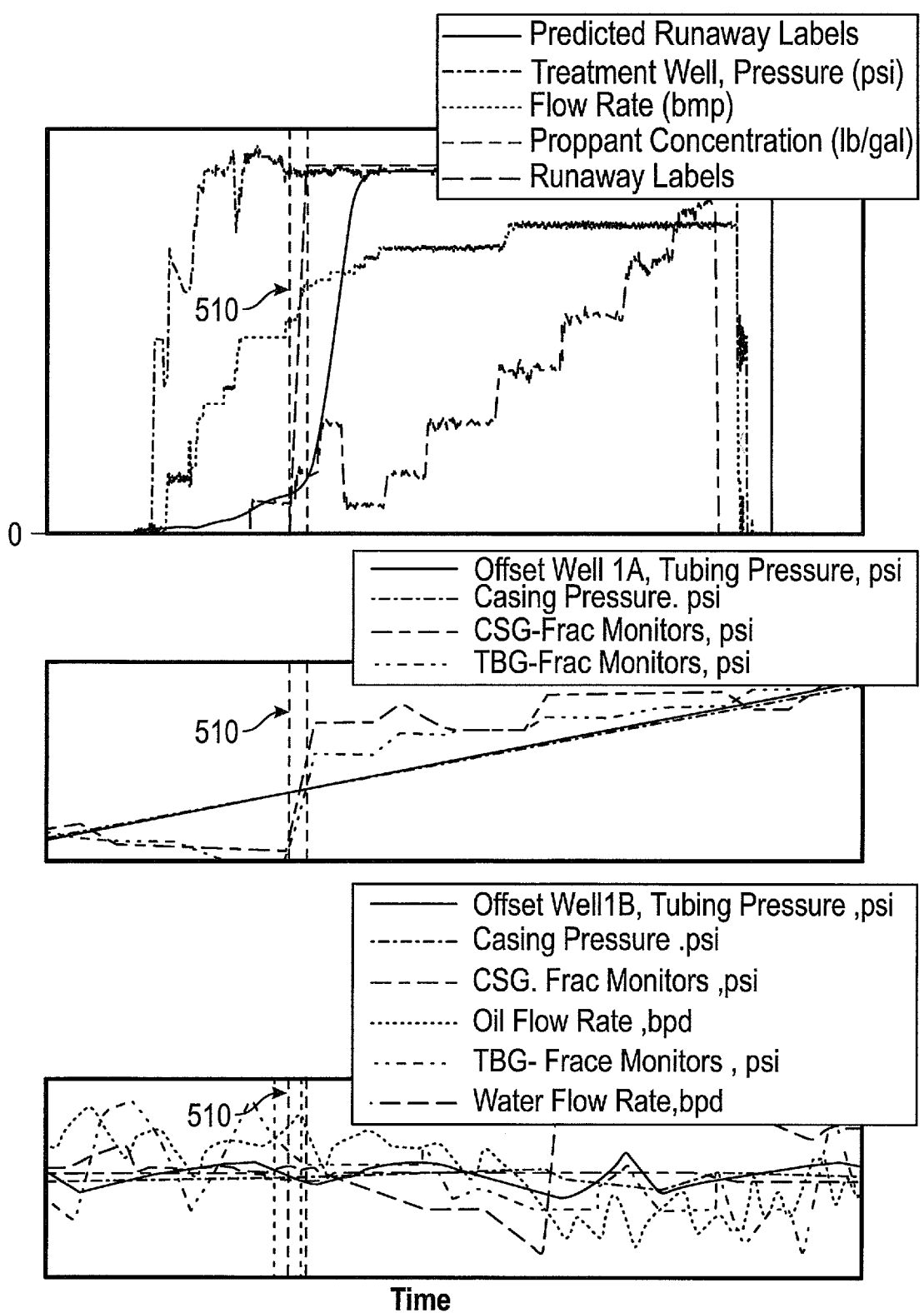
FIG. 5 provides a data plot output of a prediction by the machine learning model showing fracture driven interactions in accordance with an example embodiment of the disclosure.

Referring now to FIGS. 5 and 6, data plots are provided showing probability prediction results from the machine learning model. The data plots shown in FIGS. 5 and 6 can be generated in connection with validating and optimizing the trained model. FIG. 5 shows a data plot for a stage that encounters a fracture driven interaction, whereas FIG. 6 shows a data plot for a normal stage that does not encounter a fracture driven interaction. Referring to FIG. 5, the top portion of the figure shows a plot of data gathered from the treatment well 1, the middle portion of the figure shows a plot of data gathered from offset well 1A, and the bottom portion of the figures shows a plot of data gathered from offset well 1B. The data plotted for treatment well 1 and offset wells 1A and 1B has been synchronized using time stamps associated with the collected data. The data plotted for treatment well 1 are pressure, flow rate, proppant con- centration, FDI event labels from measured data, and pre- dicted FDI events. The data plotted for offset wells 1A and 1B are oil flow rate, water flow rate, casing pressure, tubing pressure, casing pressure from fracture monitors, and tubing pressure from fracture monitors. Vertical lines 510 indicate the FDI event labels corresponding to the triggers described in connection with FIG. 3A. The plotted data for treatment well 1 shows the predicted FDI events slightly lagging behind the FDI event labels, but the substantial overlap indicates the model is providing fairly accurate predictions of FDI events.

For comparison, FIG. 6 provides a data plot for a normal stage that does not encounter an FDI event. The data plotted for treatment well 2 in FIG. 6 are pressure, flow rate, proppant concentration, FDI event labels from measured data (of which there are none), and predicted FDI events (of which there are none). The data plotted for offset well 2A are oil flow rate, water flow rate, casing pressure, tubing pres- sure, casing pressure from fracture monitors, and tubing pressure from fracture monitors. Consistent with the absence of labeled FDI events in the data set shown in FIG. 6 for treatment well 2, the model predicted no FDI events.

Figure 7:
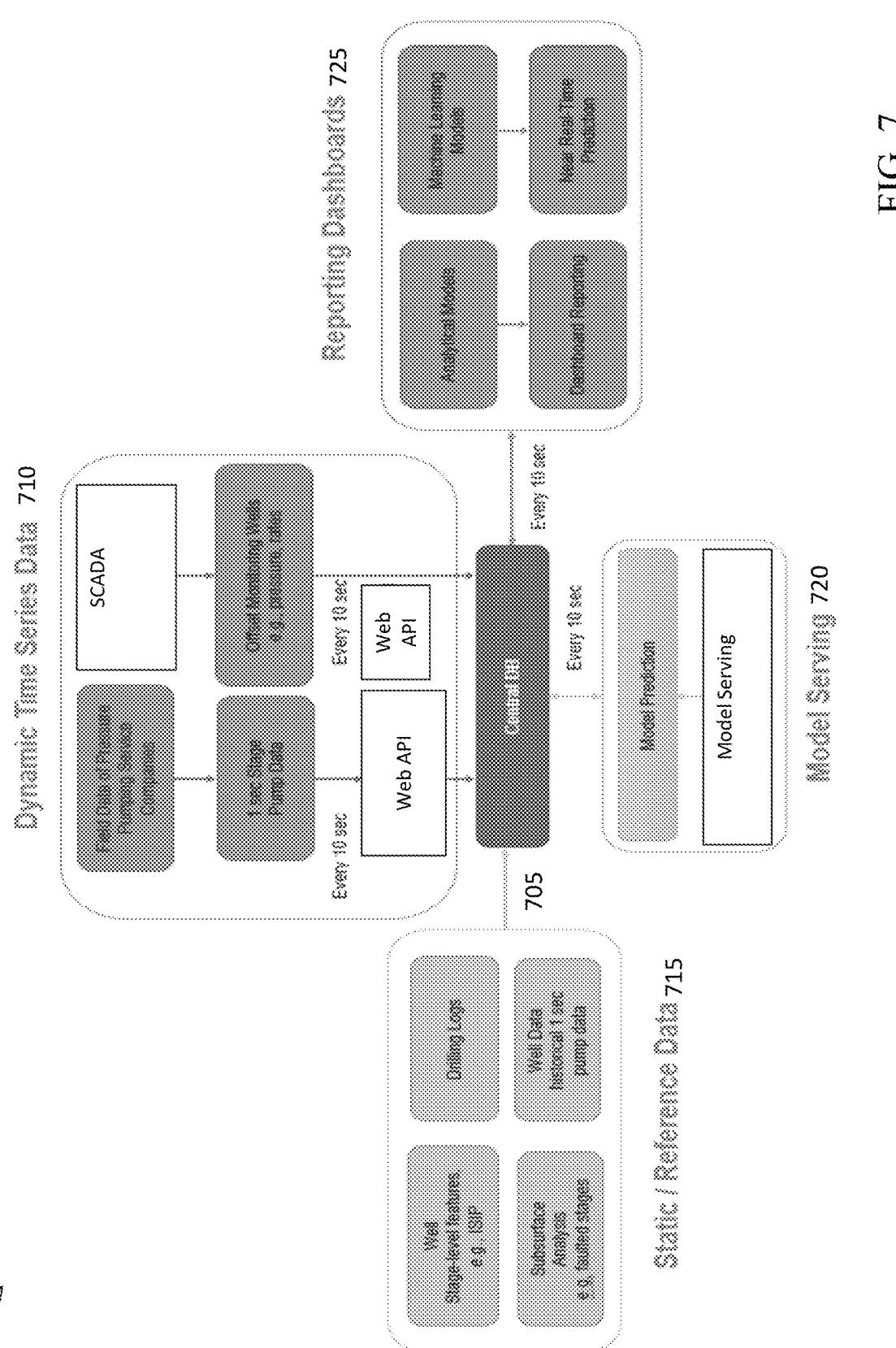
FIG. 7 illustrates computing systems associated with a deployed machine learning model in accordance with an example embodiment of the disclosure.
Figure 8:
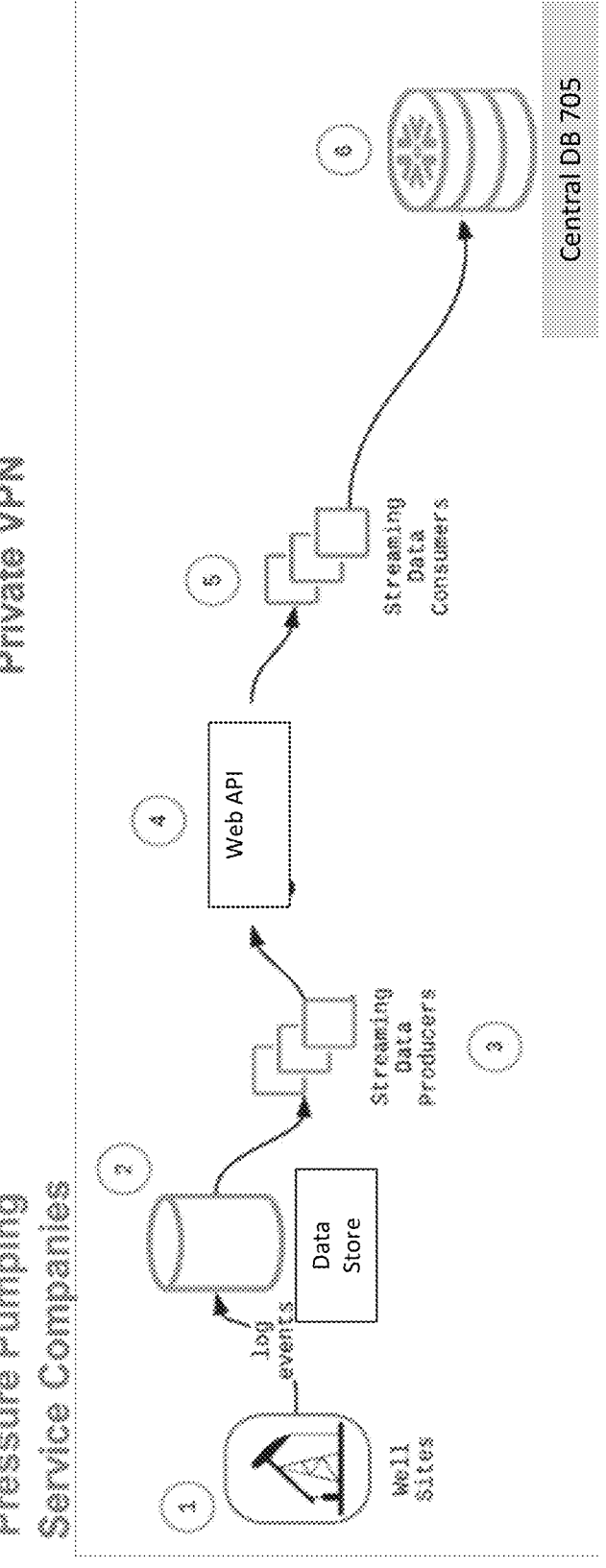
FIG. 8 illustrates an expanded view of real-time streaming of pump data for use by the deployed machine learning model in accordance with an example embodiment of the disclosure.
Figure 9:
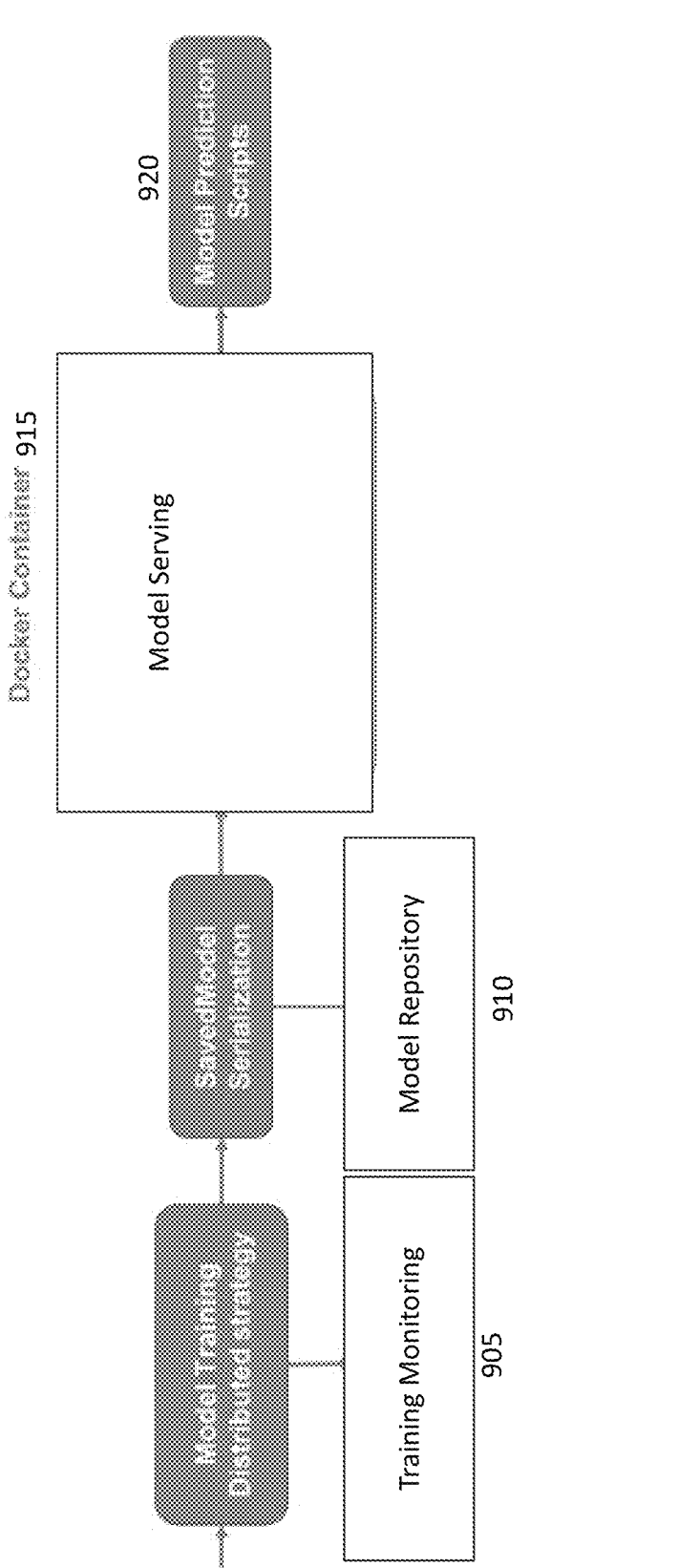
FIG. 9 illustrates detailed processes within the deployed machine learning model server of FIG. 7 in accordance with an example embodiment of the disclosure.

Referring now to FIGS. 7, 8, and 9, computing compo- nents associated with the collection of data, the training of the model, and the deployment of the model are illustrated. It should be understood that the components illustrated in FIGS. 7, 8, and 9 are merely illustrative examples and that in alternate embodiments certain of the computing compo- nents can be combined, simplified, or distributed in a different manner. FIG. 7 illustrates a distributed computing system 700 having a central database 705 that receives dynamic time series data 710 from wells in the hydrocarbon field and static data 715 that describes features of the wells. The static data 715 refers to the stage-level features data previously described and can also include instantaneous static pressure (ISIP), which is the pressure at which the well is in a static state. The dynamic time series data 710 corresponds to the well treatment data and the offset well monitoring and production data that have been previously described. In the example system 700, it is proposed that data can be collected from the wells and supplied to the central database in 10 second intervals so that the model can analyze current data during a well treatment operation and provide real-time predictions of fracture driven interactions. In alternate embodiments, data can be gathered from the wells and supplied to the central database 705 at other intervals as may be appropriate for a particular well treat- ment operation. As used herein, "real-time" refers to pro- viding prompt data analysis and predictions of fracture driven interactions, preferably within less than 15 minutes, or more preferably within less than 10 minutes, or even more preferably within less than 5 minutes of the data collection so that well completion engineers can use the predictions to reduce fracture driven interactions during a well treatment operation.

The model serving component 720 can comprise one or more computer server devices that store and execute the previously described machine learning algorithm and machine learning model. Accordingly, the machine learning algorithm can collect the dynamic time series data 710 and the static data 715 from the central database 705 and use the collected data to train the machine learning model. Once the model is trained and validated, the model serving component 720 can make the deployed model available for use in well treatment operations. The reporting dashboards 725 can provide one or more user interfaces to the deployed model so that completion engineers can have access to real-time predictions of fracture driven interactions during well treatment operations.

FIG. 8 illustrates the collection of the dynamic time series data 710 in greater detail. In the example of FIG. 8, well treatment data or pump data is collected at a designated interval (e.g. every 1 second, every 10 seconds) and is transmitted from the field to a data store. This initial collection and storage of data may be performed by well treatment service companies. In the example of FIG. 8, a Web API can bridge the producers of the streaming data to the consumers of the streaming data. Lastly, the dynamic time series data is stored in the central database 705 for consumption by the machine learning algorithm.

FIG. 9 illustrates the model serving component 720 in greater detail. Various machine learning models can be trained using a distributed strategy. The training monitoring module 905 can monitor the training of the various machine learning models. Once the models are in final form, they can be stored in the model repository 910 for deployment. The docker container 915 stores the deployed models, which can be accessed through an API. Model prediction scripts 920 communicate with the API and the central database 705 retrieving synchronized data and making predictions of fracture driven interaction events. The model predictions can be saved in the central database 705.

Figure 10:
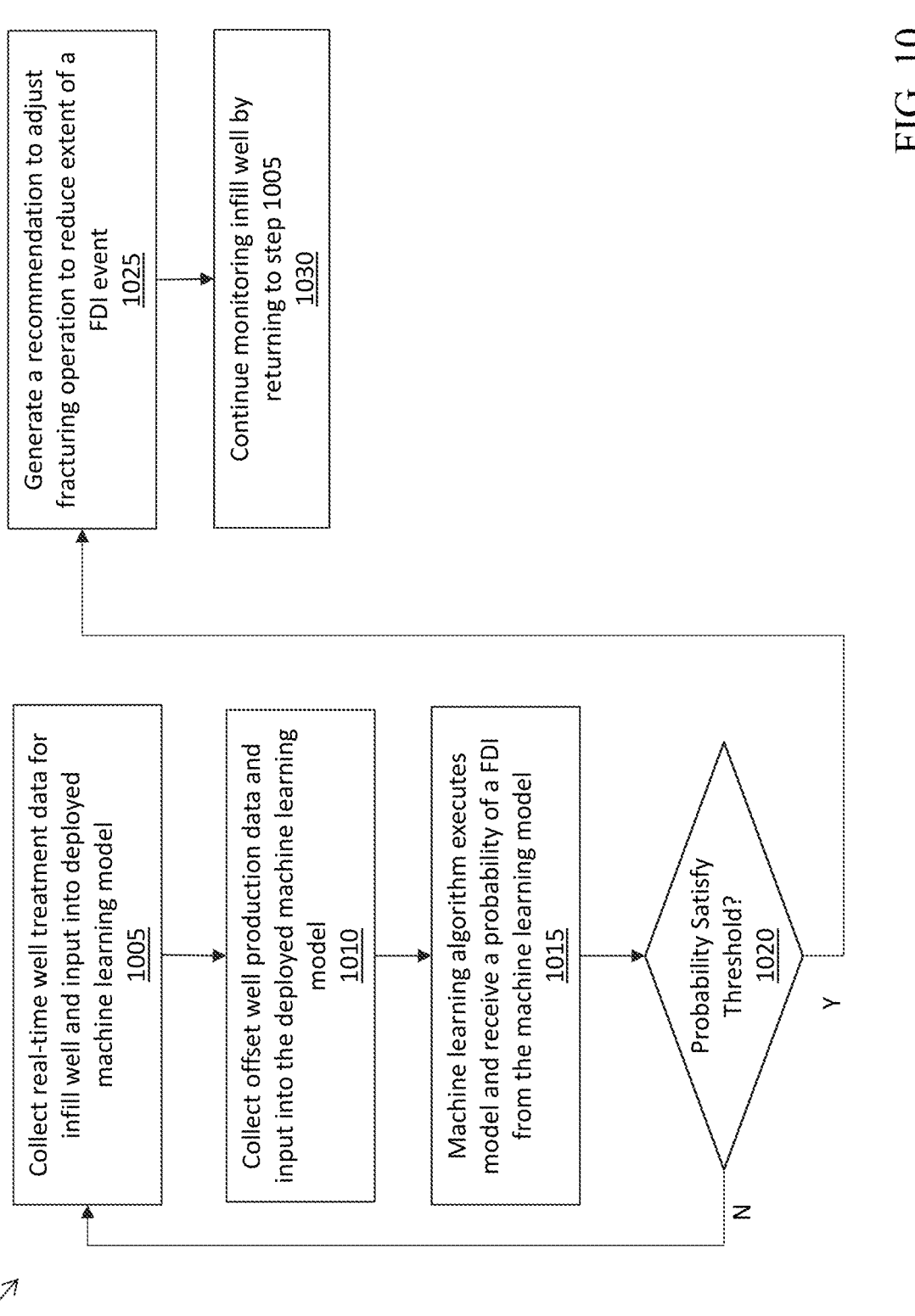
FIG. 10 illustrates a method for deploying the trained machine learning model in accordance with an example embodiment of the disclosure.

FIG. 10 illustrates in greater detail an example process for the deployment of the model 115 as previously described in connection with FIG. 1. Some or all of the operations of FIG. 10 can be performed by a machine learning algorithm that implements the deployed machine learning model. In operation 1005, the machine learning algorithm can collect real-time well treatment data for an infill well from a database and input the data into the deployed machine learning model. In operation 1010, the machine learning algorithm can collect offset well production data and input the data into the deployed machine learning model. In operation 1015, the machine learning algorithm executes the deployed model and receives a probability of an FDI event. If the probability does not exceed an acceptable threshold, the process 115 can return to step 1005 and the machine learning algorithm can continue monitoring the well treatment operation. Alternatively, if in step 1020 the probability satisfies a threshold, in step 1025 the machine leaning algorithm can provide a recommendation to adjust a fracturing operation to reduce the extent of the FDI event.

In some embodiments, a recommendation may be generated if the probability is 0.7 or higher (e.g., 0.75 or higher, 0.80 or higher, 0.85 or higher, 0.90 or higher, or 0.95 or higher). In some embodiments, a recommendation may be generated if the probability is in a range of 0.7 to 1 (e.g., a range of 0.75 to 1, a range of 0.8 to 1, a range of 0.85 to 1, a range of 0.9 to 1, or a range of 0.95 to 1). In some embodiments, a recommendation may be generated if the probability is 70% or higher (e.g., 75% or higher, 80% or higher, 85% or higher, 90% or higher, or 95% or higher). In some embodiments, a recommendation may be generated if the probability is in a range of 70% to 100% (e.g., a range of 75% to 100%, a range of 80% to 100%, a range of 85% to 100%, a range of 90% to 100%, or a range of 95% to 100%).

The recommendation can be relayed to one or more operators in the field for implementation. For example, in a hydraulic fracturing operation, the injection can be moved to another casing exit hole or horizontal leg. In other embodiments, the recommendation can involve using a diverter or modifying a treatment pressure, a flow rate, or a proppant concentration to reduce the extent of the FDI event. In certain example embodiments, the recommendation can take the form of an email or a message displayed on a dashboard associated with the machine learning algorithm. In certain example embodiments, the recommendation can provide a list of options to reduce the extent of the FDI event. Lastly, in step 1030, the machine learning algorithm can return to step 1005 and can continue monitoring the operations performed on the infill well by repeating the steps of example method 115.

Figure 11:
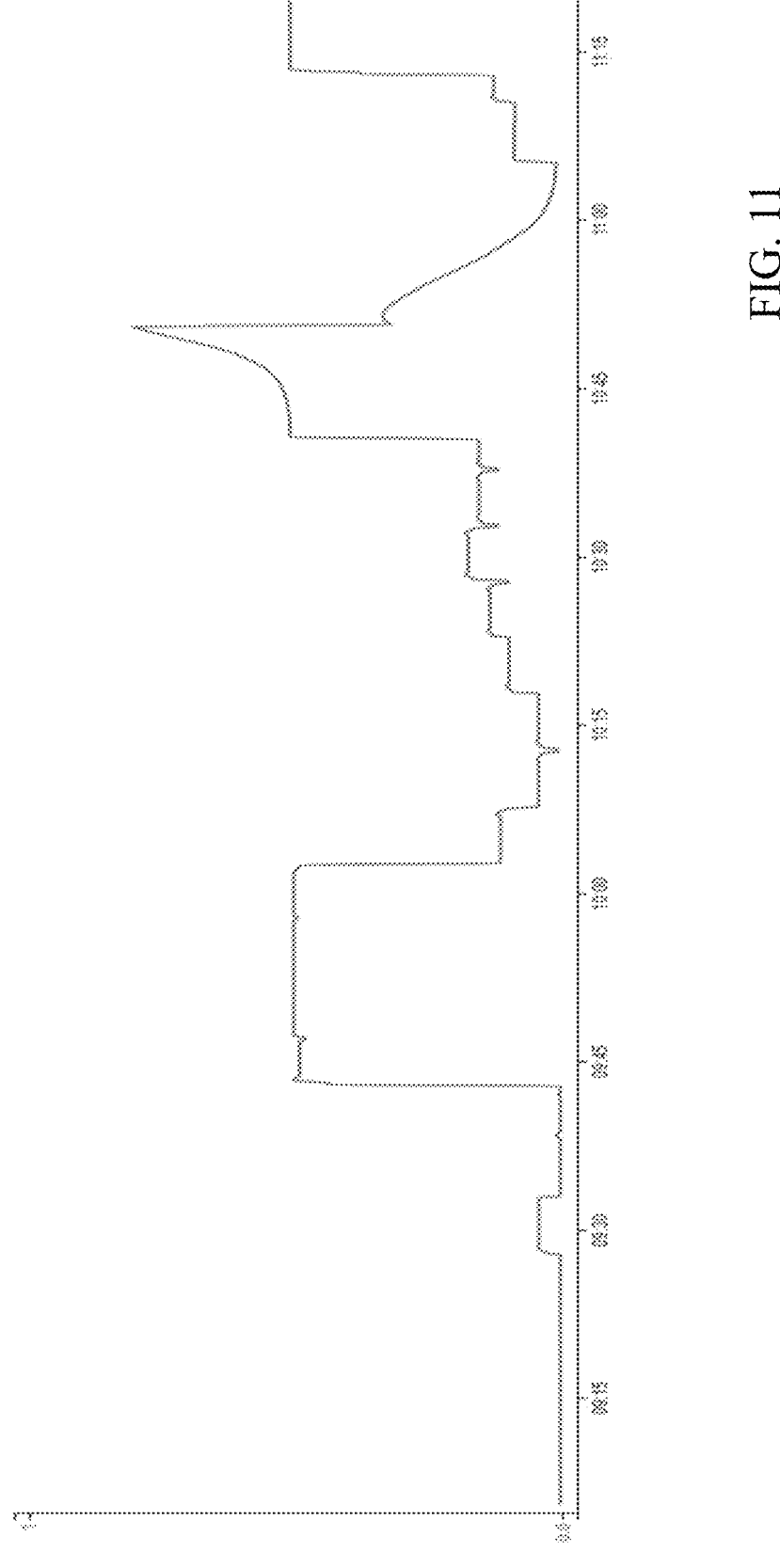
FIG. 11 provides data plots for real-time pressure and pressure slope changes of offset monitoring wells in accordance with an example embodiment of the disclosure.
Figure 12:
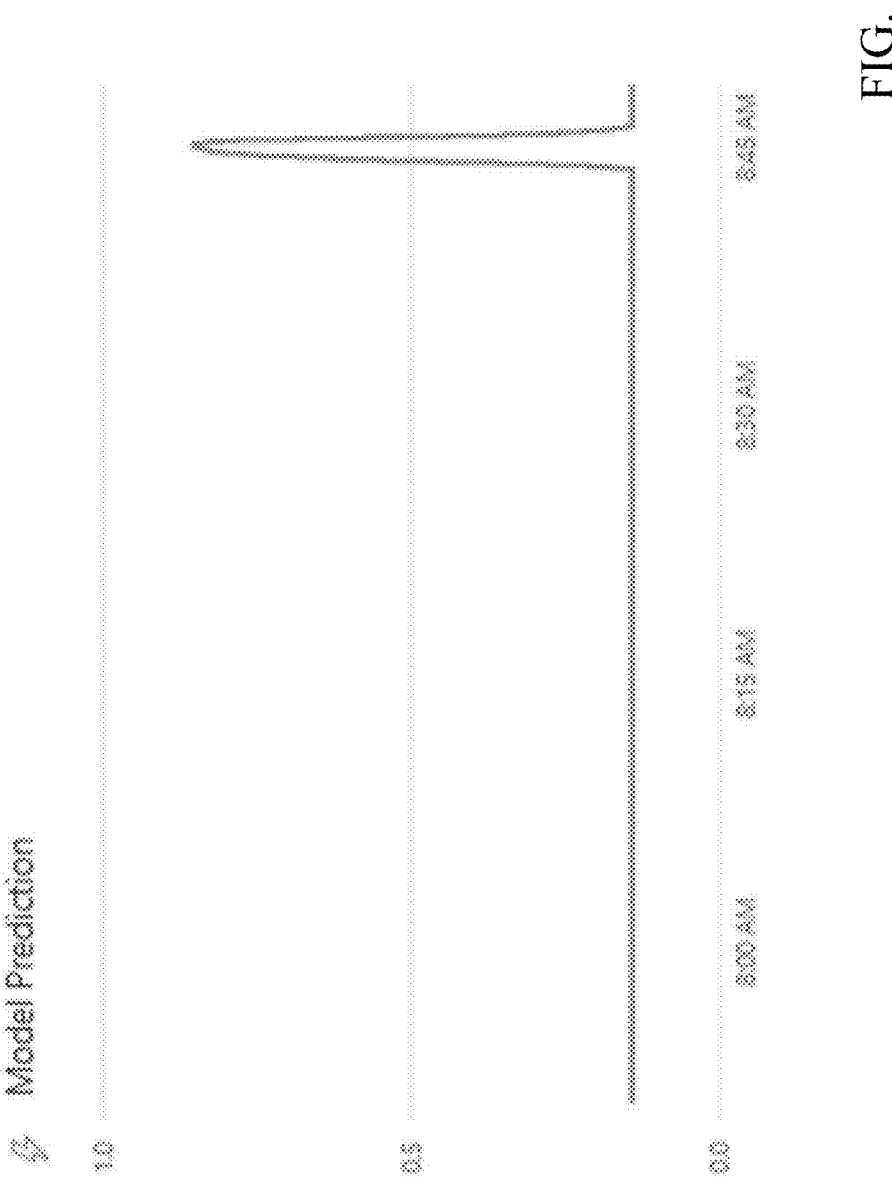
FIG. 12 provides data plots for real-time pressure, slurry rate, proppant concentration, and model prediction output in accordance with an example embodiment of the disclosure.

FIGS. 11 and 12 provide examples of data plots that can be displayed in real-time by the reporting dashboards 725. FIGS. 11 and 12 shows plots of model predictions of an FDI event over designated time frames.

General Information Regarding Computing Systems

As described in connection with FIGS. 7-9, some or all of the processing operations described in connection with the foregoing systems and methods can be performed by computing systems such as a personal computer, a desktop computer, a computer server, or cloud computing systems. As explained previously, certain operations of the foregoing methods can be performed by a combination of computing systems.

The computing systems used in the foregoing embodiments can include typical components such as one or more processors, a memories, input/output devices, and a storage devices. The components of the computing systems can be interconnected, for example, by a system bus or by communication links. The components of the previously described computing systems are not exhaustive.

The one or more processors can be one or more hardware processors and can execute computer-readable instructions, such as instructions stored in a memory. The processor can be an integrated circuit, a central processing unit, a multi-core processing chip, an SoC, a multi-chip module including multiple multi-core processing chips, or other hardware processor in one or more example embodiments. The hardware processor is known by other names, including but not limited to a computer processor, a microprocessor, and a multi-core processor.

The memory can store information including computer-readable instructions and data. The memory can be cache memory, a main memory, and/or any other suitable type of memory. The memory is a non-transitory computer-readable medium. In some cases, the memory can be a volatile memory device, while in other cases the memory can be a non-volatile memory device.

The storage device can be a non-transitory computer-readable medium that provides large capacity storage for a computing system. The storage device can be a disk drive, a flash drive, a solid state device, or some other type of storage device. In some cases, the storage device can be a database that is remote from the computing system. The storage device can store operating system data, file data, database data, algorithms, and software modules, as examples.

Assumptions and Definitions

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

The term "obtaining" may include receiving, retrieving, accessing, generating, etc. or any other manner of obtaining data.

Terms such as "first" and "second" are used merely to distinguish one component (or part of a component or state of a component) from another. Such terms are not meant to denote a preference and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Values, ranges, or features may be expressed herein as "about", from "about" one particular value, and/or to "about" another particular value. When such values, or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system comprising:

a pumping system comprising at least one pressure sensor and at least one flow sensor, the pumping system providing well treatment data for an infill well undergoing hydraulic fracturing treatment, the well treatment data comprising proppant concentration data and slurry flow rate data;

an offset well monitoring system comprising at least one offset well pressure sensor, the offset well monitoring system providing offset well production data for an offset well, the offset well production data comprising tubing pressure data and casing pressure data for the offset well;

a processor;

a memory; and a machine learning algorithm stored in the memory and configured to execute by the processor a machine learning model, wherein the machine learning model was previously trained using historical well treatment data and historical offset well production data, the machine learning model comprising:

a first input node configured to obtain the well treatment data for the infill well from the pumping system;

a first intermediate node configured to:

obtain the well treatment data from the first input node, perform feature extraction on the well treatment data, and output a reduced set of well treatment data, a second input node configured to obtain the offset well production data for the offset well from the offset well monitoring system;

a second intermediate node configured to:

obtain the offset well production data from the second input node, perform feature extraction on the offset well production data, and output a reduced set of offset well production data, a concatenation node configured to combine the reduced set of well treatment data and the reduced set of offset well production data and to output concatenated well data; and a prediction node configured to receive the concatenated well data and provide a probability of a fracture driven interaction event at the infill well, wherein the pumping system makes an adjustment to the hydraulic fracturing treatment of the infill well based upon the probability of the fracture driven interaction event.

2. The computing system of claim 1, wherein the well treatment data and the offset well production data are real-time data associated with the infill well.

3. The computing system of claim 1, wherein the well treatment data and the offset well production data are historical data used to train the machine learning model.

4. The computing system of claim 1, wherein the prediction node is a dense layer comprising a sigmoid activation function.

5. The computing system of claim 1, wherein the first intermediate node and the second intermediate node each comprises a convolutional node and a pooling node.

6. The computing system of claim 1, wherein the machine learning model further comprises a long short-term memory node, the long short-term memory node configured to extract time dependencies of the concatenated well data.

7. The computing system of claim 1, wherein the adjustment is reducing one or more of: a treatment pressure, a slurry flow rate, and a proppant concentration.

8. The computing system of claim 1, wherein the offset well production data further comprises one or more of: oil production data or water production data.

9. The computing system of claim 1, wherein the machine learning model further comprises a third input node configured to receive static stage-level data associated with the infill well.

10. A method comprising:

inputting well treatment data and offset well production data into a machine learning model, wherein the well treatment data comprises proppant concentration data and slurry flow rate data from at least one pressure sensor of a pumping system for an infill well undergoing hydraulic fracturing treatment, wherein the offset well production data comprises tubing pressure data and casing pressure data from an offset well monitoring system for an offset well associated with the infill well, and wherein the machine learning model was previously trained using historical well treatment data and historical offset well production data;

obtaining an output from the machine learning model, the output indicating a probability of a fracture driven interaction event at the infill well; and making an adjustment to the pumping system administering the hydraulic fracturing treatment of the infill well based upon the probability of the fracture driven interaction event.

11. The method of claim 10, further comprising:

displaying a visual representation of the probability of the fracture driven interaction event.

12. The method of claim 10, wherein the machine learning model was previously trained by:

obtaining the historical well treatment data at a first input node;

performing feature extraction on the historical well treatment data at a first intermediate node;

outputting a reduced set of historical well treatment data from the first intermediate node;

obtaining historical offset well production data at a second input node;

performing feature extraction on the historical offset well production data at a second intermediate node; and outputting a reduced set of historical offset well production data; and combining the reduced set of well treatment data and the reduced set of offset well production data at a concatenation node and outputting concatenated well data; and calculating the probability of the fracture driven interaction event using a prediction node.

13. The method of claim 12, further comprising validating the probability of the fracture driven interaction event against historical fracture driven interaction data.

14. The method of claim 12, wherein the prediction node is a dense layer comprising a sigmoid activation function.

15. The method of claim 12, wherein the machine learning model further comprises a long short-term memory node, the long short-term memory node configured to extract time dependencies of the concatenated well data.

16. The method of claim 10, wherein:

the adjustment is reducing one or more of: a treatment pressure, a slurry flow rate, and a proppant concentration.

17. The method of claim 10, wherein the well treatment data and offset well production data are real-time data associated with the infill well.

18. A method comprising:

inputting well treatment data and offset well production data into a machine learning model, wherein the well treatment data comprises proppant concentration data and slurry flow rate data from at least one pressure sensor of a pumping system for an infill well undergoing hydraulic fracturing treatment, and wherein the offset well production data comprises tubing pressure data and casing pressure data from an offset well monitoring system for an offset well associated with the infill well;

obtaining an output from the machine learning model, the output indicating a probability of a fracture driven interaction event at the infill well; and making an adjustment to the pumping system administering the hydraulic fracturing treatment of the infill well based upon the probability of the fracture driven interaction event.

19. The method of claim 18, further comprising:

updating the machine learning model based on an accuracy of the probability of the fracture driven interaction event at the infill well when compared to actual data.

* * * * *